United States Patent [19]

Sensui

[11] Patent Number: 5,748,384
[45] Date of Patent: May 5, 1998

[54] ZOOM LENS

[75] Inventor: Takayuki Sensui, Tokyo, Japan

[73] Assignee: Asahi Kogaku Kogyo Kabushiki Kaisha, Tokyo, Japan

[21] Appl. No.: 715,476

[22] Filed: Sep. 18, 1996

[30] Foreign Application Priority Data

Sep. 20, 1995 [JP] Japan .................. 7-266458

[51] Int. Cl.$^6$ .............. G02B 15/14; G02B 3/02
[52] U.S. Cl. .......................... 359/686; 359/715
[58] Field of Search .................. 359/686, 715

[56] References Cited

U.S. PATENT DOCUMENTS

| 4,516,839 | 5/1985 | Tokumaru | 359/686 |
|---|---|---|---|
| 5,276,553 | 1/1994 | Tatsuno | 359/686 |
| 5,416,639 | 5/1995 | Yamanashi | 359/686 |
| 5,576,890 | 11/1996 | Tanaka et al. | 359/686 |
| 5,585,970 | 12/1996 | Shibayama | 359/686 |

FOREIGN PATENT DOCUMENTS

| 2-201310 | 8/1990 | Japan | 359/686 |
|---|---|---|---|
| 2 253 281 | 9/1992 | United Kingdom | 359/686 |

*Primary Examiner*—David C. Nelms
*Assistant Examiner*—Evelyn A. Lester
*Attorney, Agent, or Firm*—Greenblum & Bernstein P.L.C.

[57] ABSTRACT

A zoom lens includes a negative first lens group, a positive second lens group, a negative third lens group and a positive fourth lens group, arranged in this order from an object side. Upon zooming from a wide-angle extremity toward a telephoto extremity, all of the lens groups are moved so that a distance between the first and second lens groups is decreased, a distance between the second and third lens groups is increased, and the distance between the third and fourth lens groups is decreased. The zoom lens satisfies the following relationships:

$$1.0 < z2/z234 < 1.5$$

and $$Fw > 3.4,$$

where "z2" represents a ratio obtained by dividing the lateral magnification of the second lens group at the telephoto extremity by the lateral magnification of the second lens group at the wide-angle extremity, "z234" represents the ratio obtained by dividing the resultant lateral magnification of the second through fourth lens groups at the telephoto extremity by the resultant lateral magnification of the second through fourth lens groups at the wide-angle extremity, and "Fw" represents the F-number of the whole zoom lens at the wide-angle extremity.

5 Claims, 17 Drawing Sheets

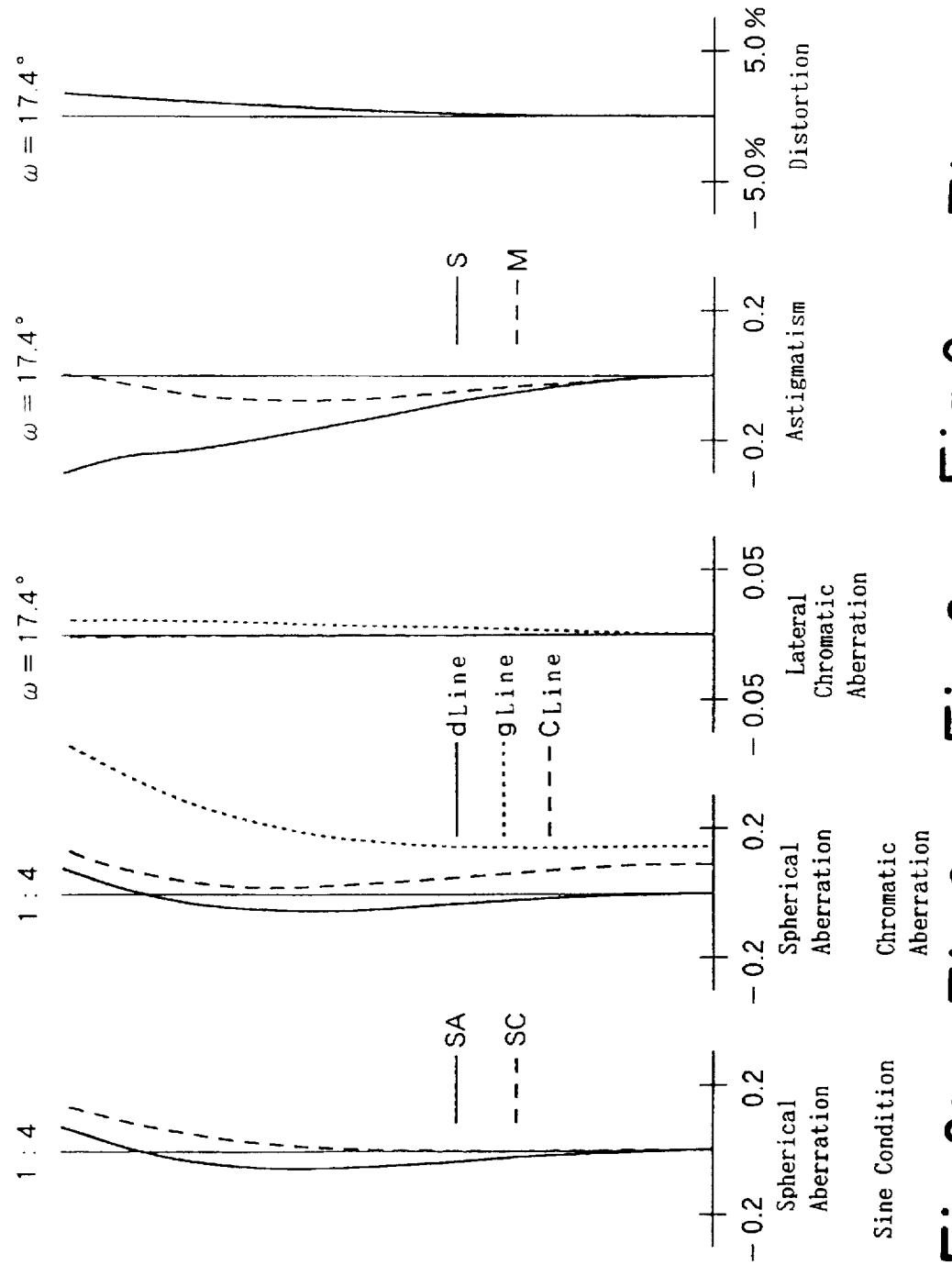

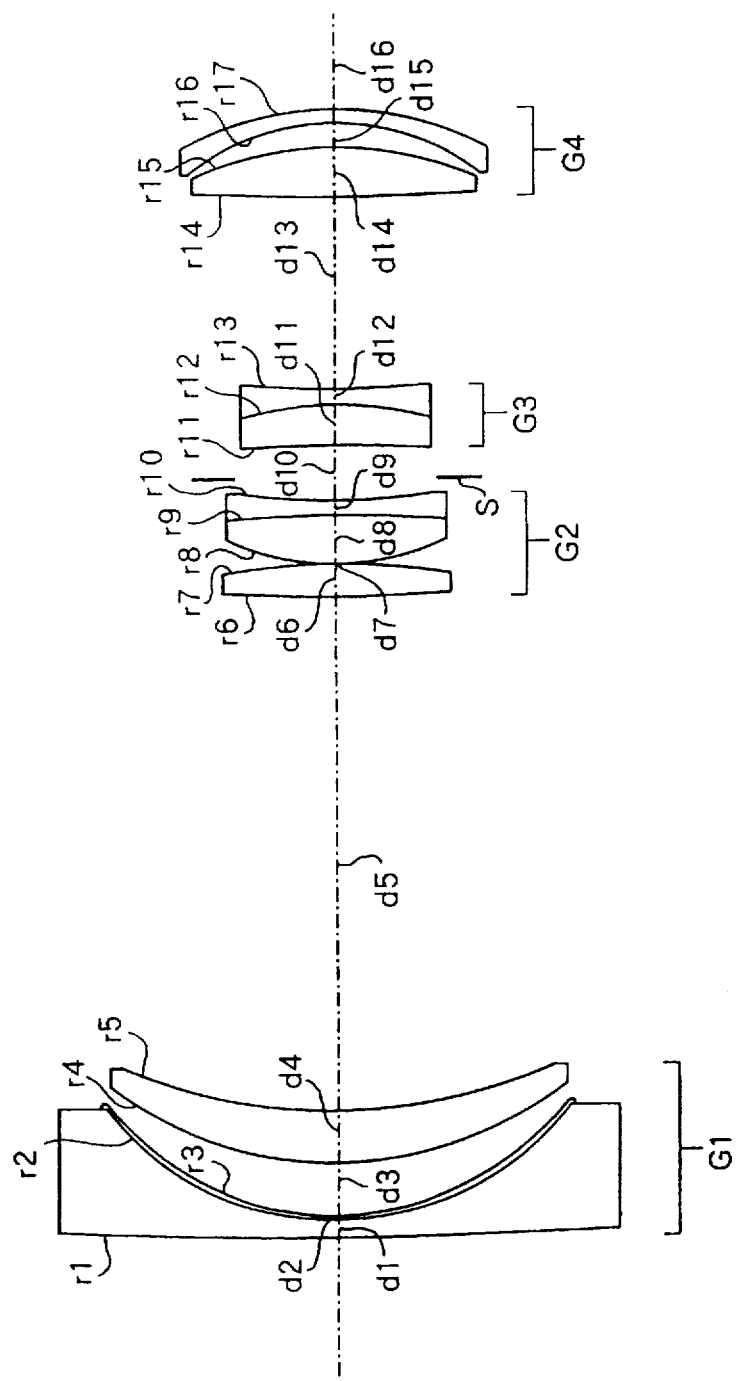

ZOOM LENS

BACKGROUND OF THE INVENTION

1. Field of the Invention

The present invention relates to a zoom lens having four lens groups, namely, a negative first lens group, a positive second lens group, a negative third lens group and a positive fourth lens group, arranged in this order from an object side.

2. Description of the Related Art

In a known conventional zoom lens having four lens groups consisting of a negative first lens group, a positive second lens group, a negative third lens group, and a positive fourth lens group arranged in this order from an object side, as disclosed in, for example, U.S. Pat. No. 4,516,839, the F-number at the wide angle extremity is set to be approximately equal to 1:4.1.

However, in the conventional zoom lens, since the contribution of the second lens group to the zooming function in relation to the whole optical system is relatively low, and further since the zooming function is shared by the third and fourth lens groups, the aberration correction capability of the third and fourth lens groups is reduced. Consequently, in the zoom lens disclosed in the above mentioned U.S. Pat. No. '839, the aberration fluctuation during the zooming operation increases undesirably.

SUMMARY OF THE INVENTION

It is an object of the present invention to provide a zoom lens in which the zooming function is appropriately distributed to each lens group to reduce the aberration fluctuation caused during the zooming operation.

To achieve the object mentioned above, according to the present invention, there is provided a zoom lens having a negative first lens group, a positive second lens group, a negative third lens group and a positive fourth lens group, arranged in this order from an object side. During a zooming operation from a wide-angle extremity towards a telephoto extremity, all the lens groups are moved so that the distance between the first and second lens groups is reduced, the distance between the second and third lens groups is increased, and the distance between the third and fourth lens groups is reduced. The zoom lens satisfies the following relationships:

$$1.0 < z2/z234 < 1.5 \quad (1)$$

$$Fw > 3.4 \quad (2)$$

wherein, z2 represents the ratio obtained by dividing the lateral magnification of the second lens group at the telephoto extremity by the lateral magnification thereof at the wide-angle extremity, z234 represents the ratio obtained by dividing the lateral magnification of the second through fourth lens groups at the telephoto extremity by the lateral magnification thereof at the wide-angle extremity, and Fw represents the F-number of the whole lens system at the wide-angle extremity.

Relationship (1) specifies the degree of the contribution of the second lens group to the zooming function with respect to the whole lens system (it should be noted that the first lens group does not contribute to the zooming function). In a zoom lens having four lens groups, lateral magnification varies in accordance with the movement of the second, third and fourth lens groups. If the zoom lens satisfies relationship (1), the displacement of the second lens group mainly contributes to the zooming function with respect to the whole lens system, and hence, the third and fourth lens groups are chiefly adapted to restrict the aberration fluctuation caused by the zooming operation. Consequently, little or no variation of aberrations takes place during the zooming operation.

If the ratio defined in relationship (1) is below the lower limit, the third and fourth lens groups must be used to vary the magnification. This reduces the aberration correction capability, resulting in an enhanced curvature of the field.

If the ratio defined in relationship (1) exceeds the upper limit, the power of the second lens group is so large that it is necessary to increase the number of lens elements which constitute the second lens group to restrict the aberrations.

Relationship (2) specifies the F-number at the wide-angle extremity. If the zoom lens satisfies relationship (2), a good optical property can be obtained by a small number of lens elements. If the F-number is below than the limit stated in relationship (2), the effective diameter becomes large, and hence it is necessary to increase the number of lens elements to obtain a good optical property. This makes the lens system large and expensive. To obtain a bright image surface, it is preferable that the F-number at the wide-angle extremity is not larger than 1:5.6.

Preferably, the zoom lens satisfies the following relationships:

$$-1.9 < ft/f3 < -0.6 \quad (3)$$

$$m34w < 1.4 \quad (4)$$

wherein, ft represents the focal length of the whole lens system at the telephoto extremity, f3 represents the focal length of the third lens group, and m34w represents the lateral magnification of the third and fourth lens groups at the wide-angle extremity.

Relationship (3) defines the power of the third lens group in relation to the whole lens system. If the zoom lens satisfies relationship (3), it is possible to correct the aberrations caused in the second lens group while restricting a deterioration of the optical property due to decentering or deviation of the third lens group, as well as maintain an appropriate negative power of the third lens group. If the ratio defined in relationship (3) is below than the lower limit, the negative power of the third lens group is so large that the optical property deteriorates remarkably due to decentering or a deviation of the third lens group (which occurs owing to an assembly error or an oscillation during the zooming operation). If the ratio defined in relationship (3) exceeds the upper limit, the negative power of the third lens group is insufficient to correct the aberrations produced by the positive second lens group.

Relationship (4) specifies the lateral magnification of the third and fourth lens groups at the wide-angle extremity. If the lateral magnification satisfies relationship (4), the aberration fluctuation is restricted during the zooming operation. If the resultant lateral magnification exceeds the limit defined in relationship (4), variation of the aberrations is too large to correct.

The first lens group preferably consists of a negative first lens element and a positive second lens element in this order from the object side. In this arrangement, preferably, at least one surface of the two lens elements is an aspherical surface and satisfies the following relationship:

$$0.30 < dG1/fw < 0.55 \quad (5)$$

wherein, dG1 represents the thickness of the first lens group on the optical axis, and fw represents the focal length of the whole lens system at the wide-angle extremity.

Relationship (5) specifies the thickness of the first lens group, i.e., the distance between the surface of the first lens element on the object side and the surface of the second lens element on the image side. If relationship (5) is satisfied, the first lens group is made as small as possible provided the aberrations do not deteriorate during zooming. If the ratio defined in relationship (5) is below than the lower limit, freedom of design is extremely restricted, and hence, it is difficult to cancel or eliminate the aberrations caused by the first and second lens elements of the first lens group. Consequently, the aberrations vary considerably during the zooming operation. If the ratio defined in relationship (5) exceeds the upper limit, the thickness of the first lens group is above a value necessary to correct the aberrations, thus resulting in an increase in the size of the whole lens system.

The aspherical surface of the first lens group can be formed by directly grinding and polishing a glass lens, or by providing a resin film layer on a spherical surface of a glass lens or a glass or plastic mold (hybrid aspherical lens). In the case of the hybrid aspherical lens as the first lens element, the glass lens having the hybrid aspherical lens (first lens element) preferably satisfies the following relationship:

$$1.50 < n1 < 1.65 \qquad (6)$$

wherein, n1 represents the refractive index of the first lens element.

Relationship (6) specifies the refractive index of the glass lens of the hybrid lens element (first lens element). The refractive index of an optical plastic material is approximately 1.5 to 1.6. The freedom to select the refractive index of an optical plastic material is less than for an optical glass material. Accordingly, if the refractive index of the glass lens satisfies relationship (6), a difference in the refractive index between the resin film layer and the glass lens is reduced. If the refractive index difference is small, the glass lens and the resin film layer can be deemed to be an integral lens, so that the refraction of light at the boundary surface between the glass lens and the resin film layer can be restricted. Thus, the elements are less sensitive to the irregularity in the shape of the boundary surface or a decentering or deviation thereof.

If the refractive index does not satisfy relationship (6), the difference in the refractive index between the glass lens and the resin film layer is so large that, particularly in the case when the radius of curvature of the boundary surface is small, the optical property can easily deteriorate due to a slight error or irregularity in the shape of the boundary surface or decentering or deviation thereof, etc.

The present disclosure relates to subject matter contained in Japanese Patent Application No. 7-266458 (filed on Sept. 20, 1995) which is expressly incorporated herein by reference in its entirety.

BRIEF DESCRIPTION OF THE DRAWINGS

The invention will be described below in detail with reference to the accompanying drawings, in which similar elements are indicated by similar reference numerals, and wherein:

FIGS. 8A, 8B, 8C, 8D and 8E are aberration diagrams of the zoom lens shown in FIG. 7;

FIG. 9 is a schematic view of a lens arrangement of a zoom lens according to a third embodiment of the present invention, at a wide-angle extremity;

DESCRIPTION OF THE PREFERRED EMBODIMENTS

Figure 1:
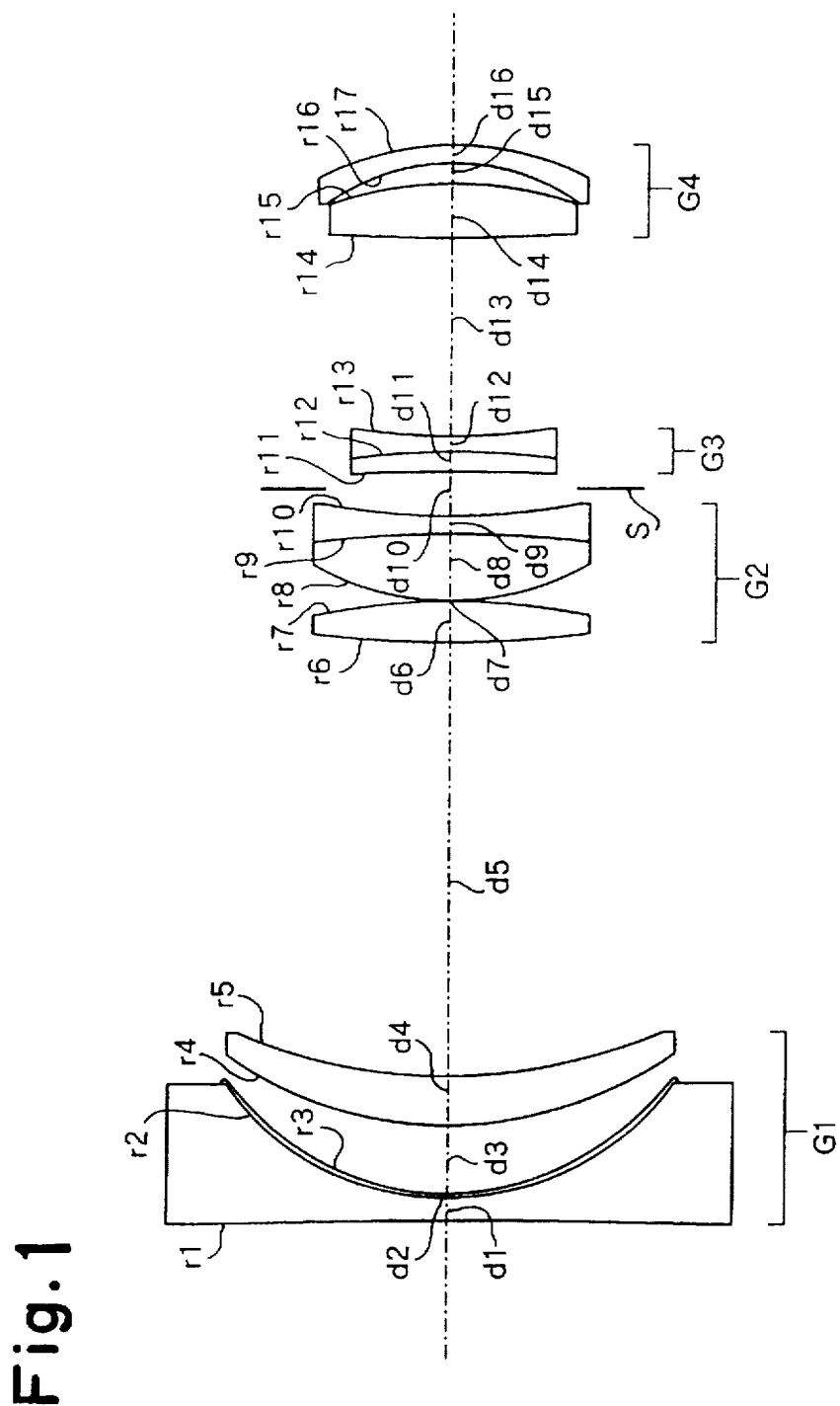
FIG. 1 is a schematic view of a lens arrangement of a zoom lens according to a first embodiment of the present invention, at a wide-angle extremity.
Figure 2:
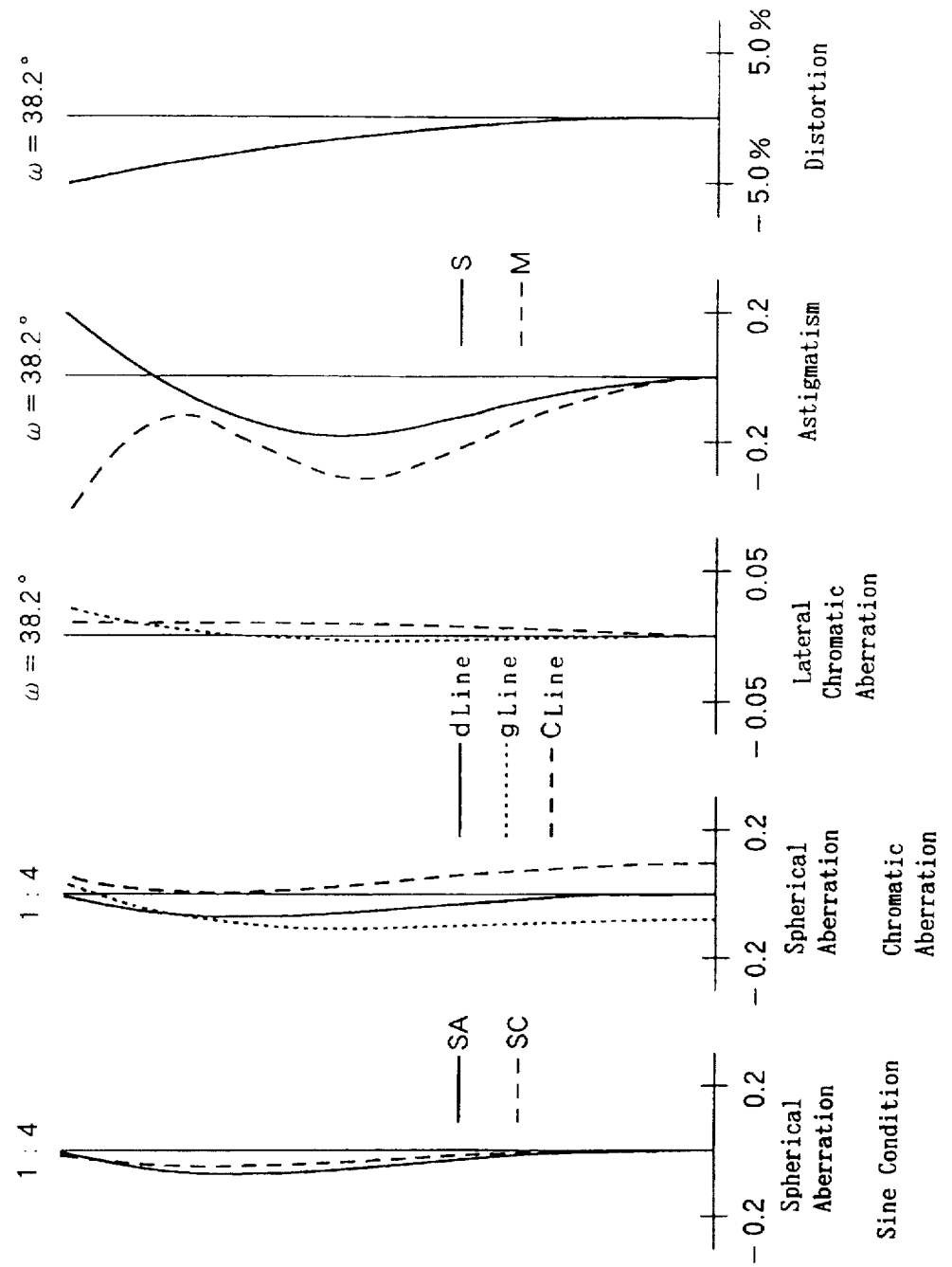
FIGS. 2A, 2B, 2C, 2D and 2E are aberration diagrams of the zoom lens shown in FIG. 1.
Figure 3:
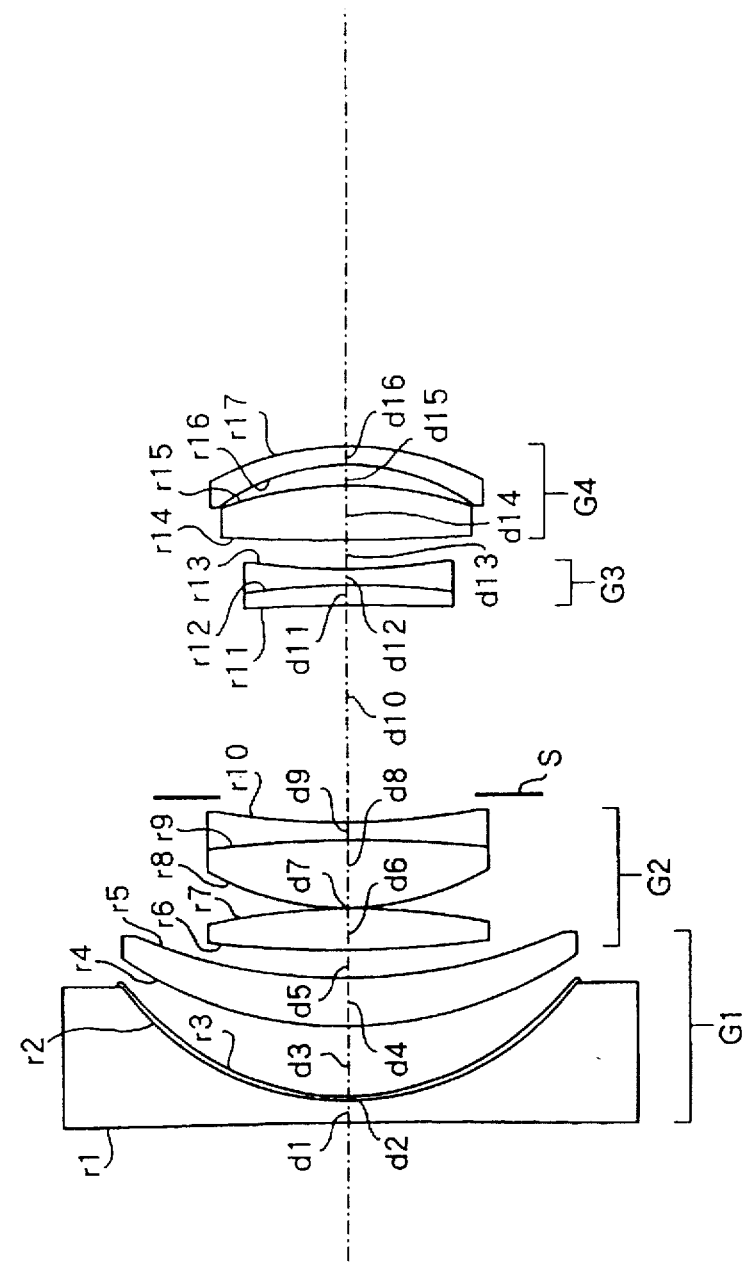
FIG. 3 is a schematic view of a lens arrangement of the zoom lens according to the first embodiment of the present invention, at a telephoto extremity.
Figure 4:
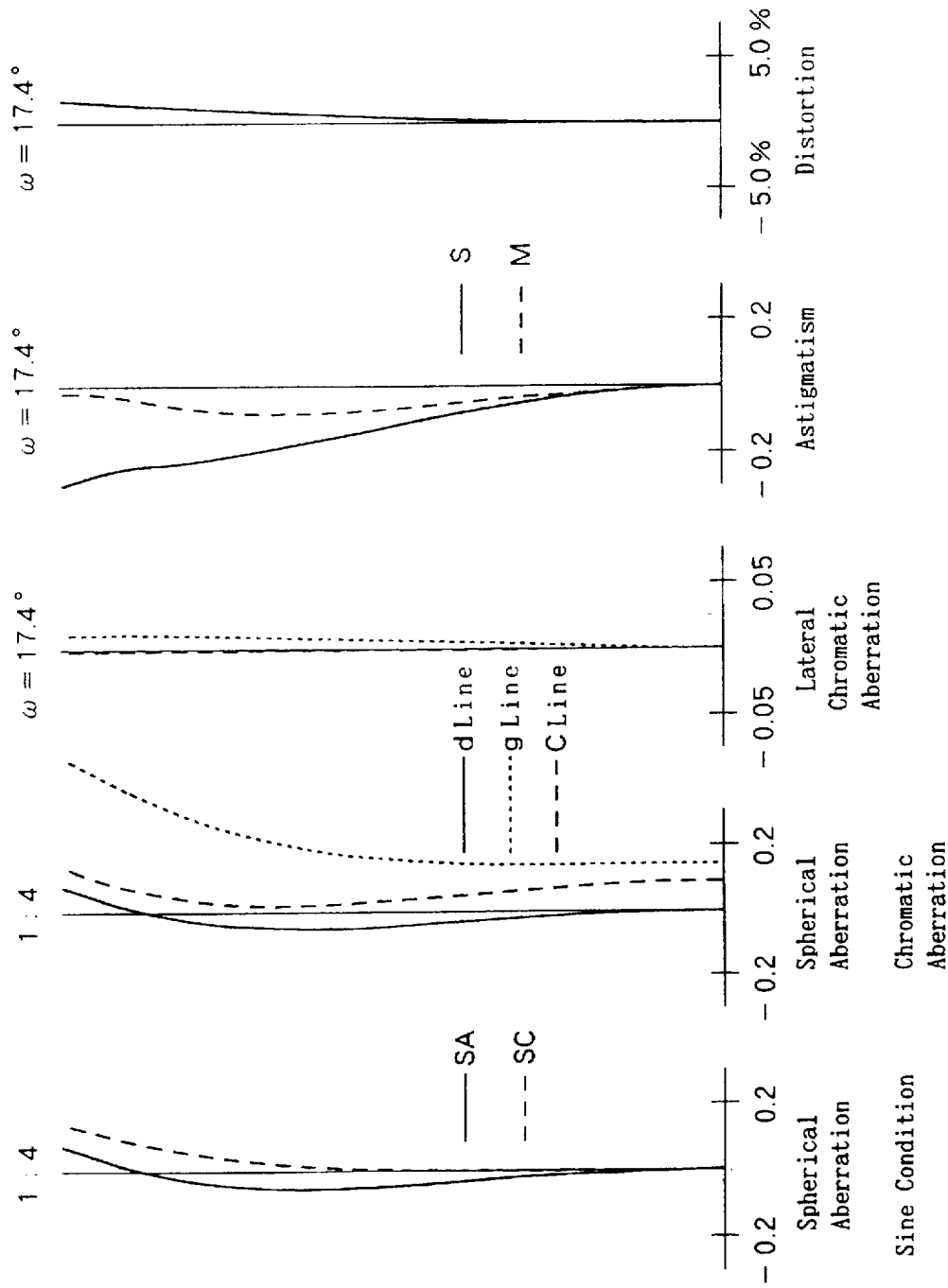
FIGS. 4A, 4B, 4C, 4D and 4E are aberration diagrams of the zoom lens shown in FIG. 3.

A zoom lens according to the present invention consists of a plurality of lens groups, namely four lens groups, as shown for example in FIGS. 1 and 3 (FIGS. 1 and 3 show the zoom lens at a wide-angle extremity and a telephoto extremity, respectively). Namely, the zoom lens consists of a negative first lens group G1, a positive second lens group G2, a negative third lens group G3 and a positive fourth lens group G4, arranged in this order from an object side (the left hand side in FIGS. 1 and 3).

The negative first lens group G1 consists of a negative first lens element and a positive second lens element, arranged in this order from the object side. The positive second lens group G2 consists of a positive lens element and a lens assembly consisting of cemented positive and negative lens elements, arranged in this order from the object side. The negative third lens group G3 consists of a lens assembly of cemented positive and negative lens elements. The fourth lens group G4 consists of a positive lens element and a negative lens element, arranged in this order from the object side.

Figure 17:
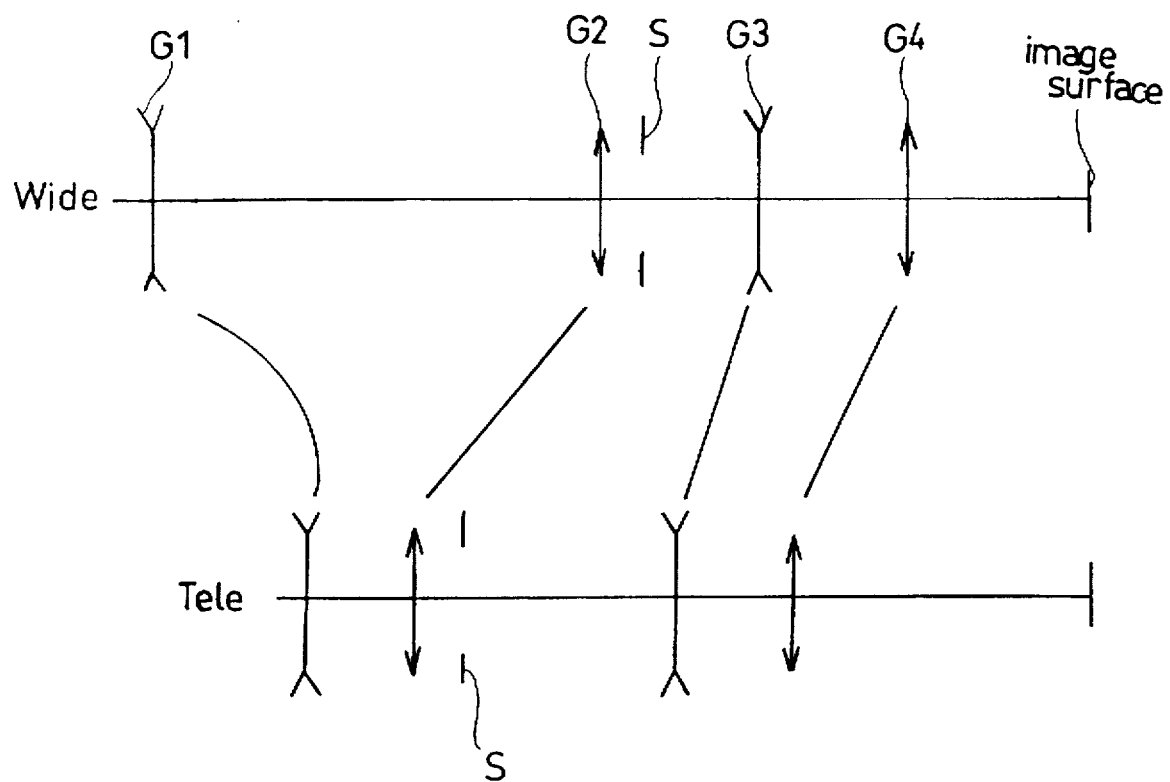

Upon zooming from the wide-angle side (extremity) toward the telephoto side (extremity), the lens groups are moved so that the distance between the first lens group G1 and the second lens group G2 is reduced, the distance between the second lens group G2 and the third lens group G3 is increased, and the distance between the third lens group G3 and the fourth lens group G4 is reduced. A diaphragm S is provided between the second and third lens groups G2 and G3. The diaphragm S is moved together with the second lens group G2 during the zooming operation. An example of the loci of the movement of the lens groups during the zooming operation is shown in FIG. 17.

Note that the first lens element of the first lens group G1 is made of a hybrid aspherical lens which is formed by pressing a thin resin layer onto a spherical glass lens using a molding die.

Several (four) embodiments (examples) of the present invention will now be discussed below with reference to the accompanying diagrams and the following tables.

In the following tables "r" represents the radius of curvature, "d" represents the lens thickness or the distance between the lenses, "n" represents the refractive index of the d-line (588 nm), "v" represents the Abbe number, "f" represents the focal length, "fb" represents the back focal distance, "$F_{NO}$" represents the F-number, and, "ω" represents the half angle of view.

In the aberration drawings (FIGS. 2A through 2E, 4A through 4E, 6A through 6E, 8A through 8E, 10A through 10E, 12A through 12E, 14A through 14E and 16A through 16E) "SA" represents the spherical aberration, "SC" represents the sine condition, "d-line", "g-line" and "C-line" represent the chromatic aberrations represented by spherical aberrations, lateral chromatic aberrations, astigmatisms ("S" represents sagittal rays, "M" represents meridional rays), and distortions.

Embodiment 1

FIGS. 1 and 3 show a first embodiment of a lens arrangement of a zoom lens at a wide-angle extremity and a telephoto extremity, respectively. Data regarding the first embodiment is shown in Tables 1 and 2 below.

FIGS. 2A through 2E and FIGS. 4A through 4E show various aberrations in the first embodiment, at the wide-angle extremity and telephoto extremity, respectively.

The first lens group consists of a negative first lens element which is provided on the surface thereof on the image side with a resin film layer, and a positive second lens element. Surface Nos. 1 and 2 represent the base surface shape of the first lens element, and surface No. 3 represents the aspherical surface formed by the resin film layer applied to the second surface No. 2.

In the first embodiment, the third surface is an aspherical surface, as mentioned above. The shape of the aspherical surface can be generally expressed as follows:

$$X=CY^2/\{1+[1-(1+K)C^2Y^2]^{1/2}\}+A_4Y^4+A_6Y^6+A_8Y^8+A_{10}Y^{10}+\ldots$$

wherein, Y represents a height above the axis,
X represents a distance from a tangent plane of an aspherical vertex,
C represents a curvature of the aspherical vertex (1/r),
K represents a conic constant,
$A_4$ represents a fourth-order aspherical factor,
$A_6$ represents a sixth-order aspherical factor,
$A_8$ represents an eighth-order aspherical factor, and
$A_{10}$ represents a tenth-order aspherical factor.

The constants of the aspherical surface are shown in Table 3. The radii of curvature of the aspherical surface in Table 1 are those at the apex of the aspherical surface.

TABLE 1

| Surface No. | r | d | n | v |
|---|---|---|---|---|
| 1 | −900.000 | 1.70 | 1.60311 | 60.7 |
| 2 | 20.698 | 0.20 | 1.52540 | — |
| 3 | 17.567 | 5.40 | — | — |
| 4 | 28.980 | 3.68 | 1.84666 | 23.8 |
| 5 | 41.200 | variable | — | — |
| 6 | 105.520 | 2.92 | 1.72916 | 54.7 |
| 7 | −58.575 | 0.10 | — | — |
| 8 | 19.783 | 5.08 | 1.48749 | 70.2 |
| 9 | −128.547 | 1.30 | 1.81786 | 23.7 |
| 10 | 64.000 | 1.92 | — | — |
| Diaphragm | | variable | | |
| 11 | −263.618 | 1.58 | 1.80518 | 25.4 |
| 12 | −64.516 | 1.30 | 1.69680 | 55.5 |
| 13 | 52.387 | variable | — | — |
| 14 | −993.485 | 3.78 | 1.72916 | 54.7 |
| 15 | −25.674 | 1.43 | — | — |
| 16 | −16.202 | 1.30 | 1.80518 | 25.4 |
| 17 | −21.880 | — | — | — |

TABLE 2

| f | 29.00 | 52.80 | 68.00 |
|---|---|---|---|
| $F_{NO}$ | 1:4 | 1:4 | 1:4 |
| ω | 38.2° | 22.1° | 17.4° |
| fb | 36.71 | 36.71 | 36.71 |
| d5 | 32.74 | 8.13 | 2.00 |
| d10 | 1.11 | 9.30 | 14.19 |
| d13 | 15.40 | 7.21 | 2.32 |

TABLE 3

| No. 3 |
|---|
| K = −1.000000 |
| A4 = 0.666032 × 10⁻⁵ |
| A6 = 0.280034 × 10⁻⁸ |
| A8 = 0.109723 × 10⁻¹⁰ |
| A10 = −0.243096 × 10⁻¹³ |

Embodiment 2

Figure 5:
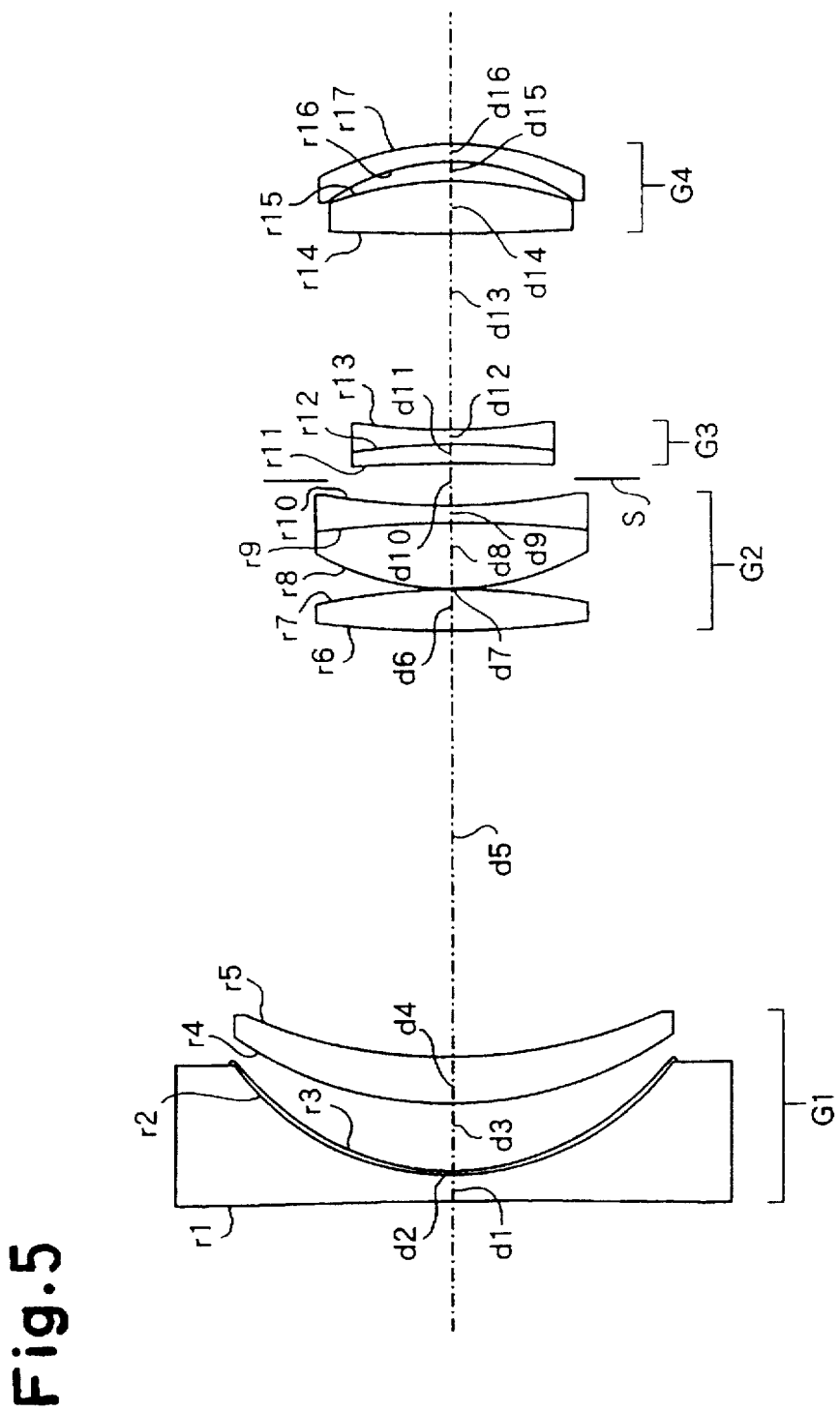
FIG. 5 is a schematic view of a lens arrangement of a zoom lens according to a second embodiment of the present invention, at a wide-angle extremity.
Figure 6:
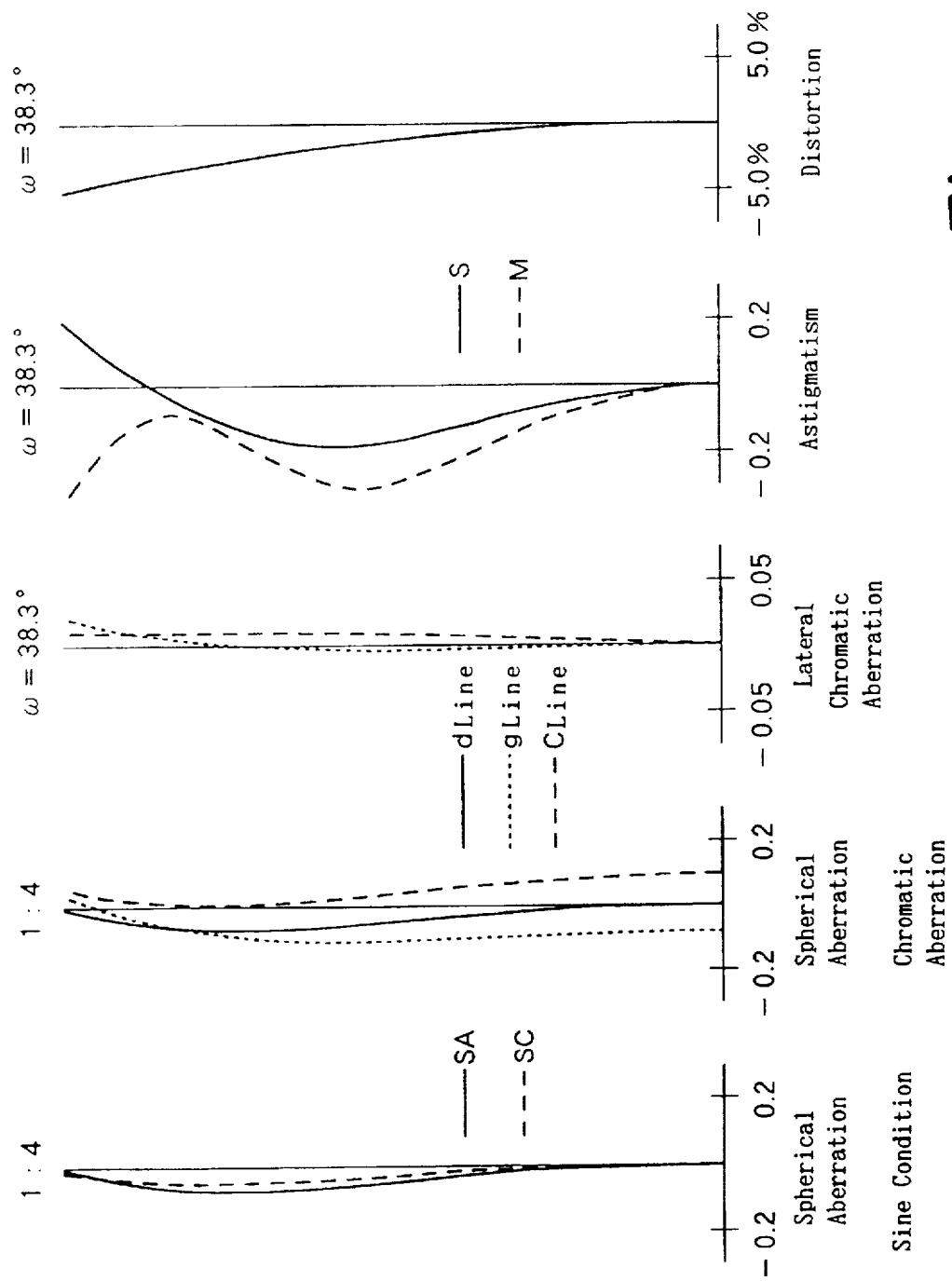
FIGS. 6A, 6B, 6C, 6D and 6E are aberration diagrams of the zoom lens shown in FIG. 5.
Figure 7:
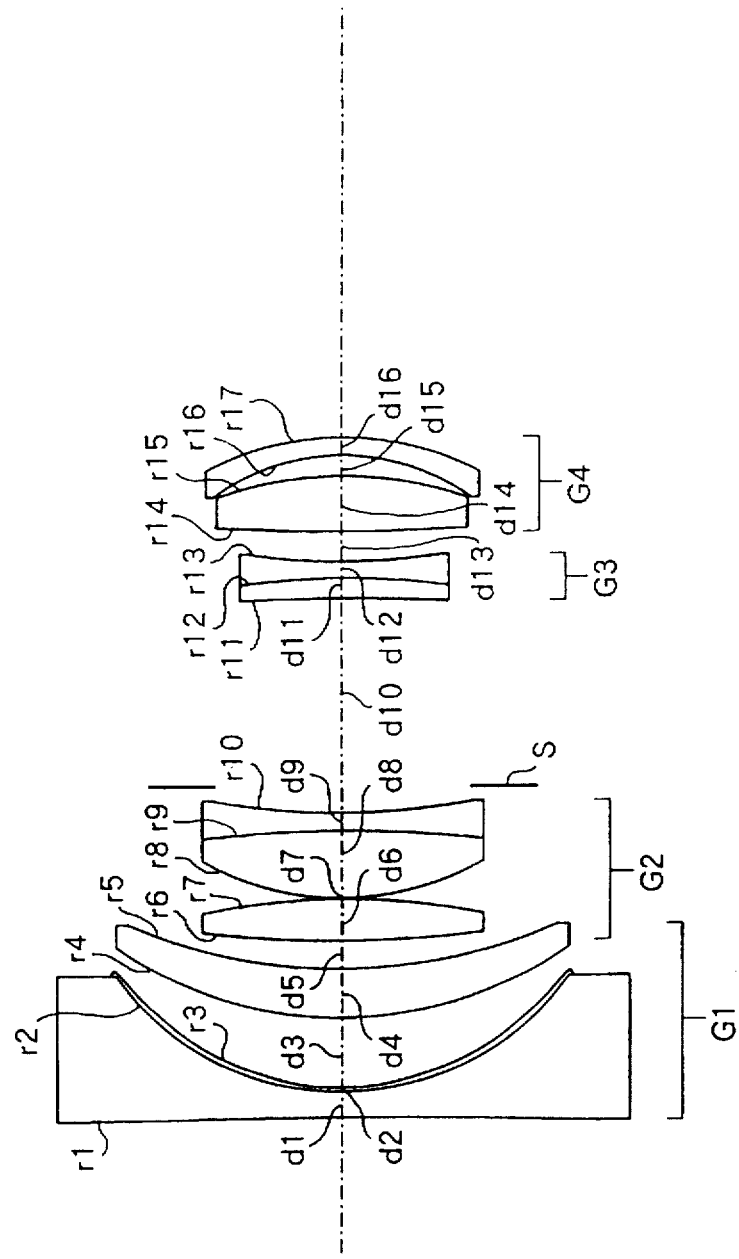
FIG. 7 is a schematic view of a lens arrangement of the zoom lens according to the second embodiment of the present invention, at a telephoto extremity.
Figures 10A, 10B, 10C, 10D, 10E:
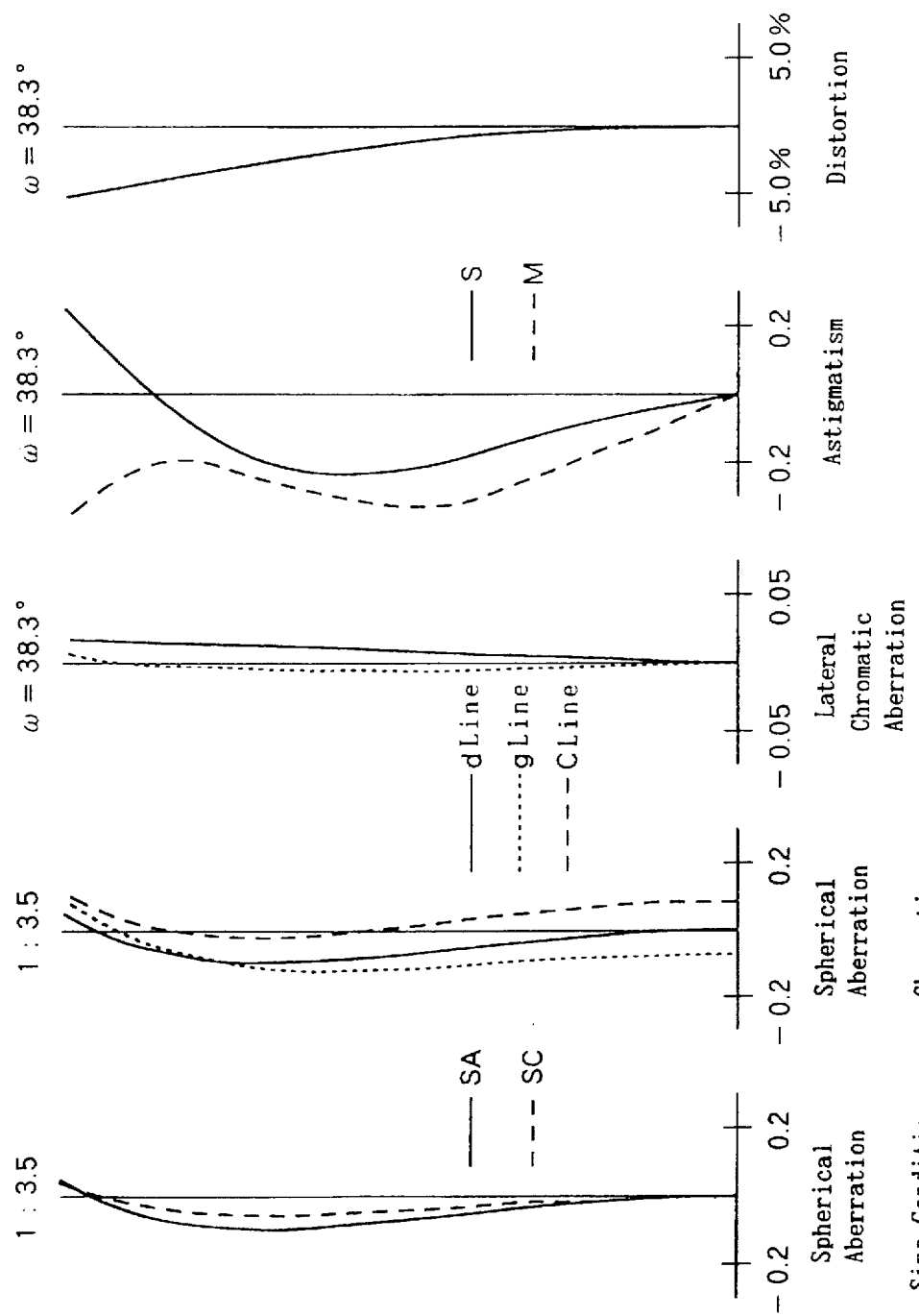
FIGS. 10A, 10B, 10C, 10D and 10E are aberration diagrams of the zoom lens shown in FIG. 9.

FIGS. 5 and 7 show a second embodiment of a lens arrangement of a zoom lens at a wide-angle extremity and a telephoto extremity, respectively. Data regarding the second embodiment is shown in Tables 4 and 5 below.

The lens arrangement of the second embodiment at the wide-angle extremity is substantially the same as that of the first embodiment, except for the thickness of the resin film layer formed on the second surface of the first lens element located on the image side. The displacement amount of the lens groups during the zooming operation in the second embodiment is slightly different from that in the first embodiment.

FIGS. 6A through 6E and FIGS. 8A through 8E show various aberrations in the second embodiment, at the wide-angle extremity and telephoto extremity, respectively. Note that the third lens surface is an aspherical surface. The constants of the aspherical surface are shown in Table 6.

TABLE 4

| Surface No. | r | d | n | ν |
|---|---|---|---|---|
| 1 | −900.000 | 1.70 | 1.60311 | 60.7 |
| 2 | 20.698 | 0.50 | 1.52540 | — |
| 3 | 17.567 | 5.40 | — | — |
| 4 | 28.980 | 3.68 | 1.84666 | 23.8 |
| 5 | 41.200 | variable | — | — |
| 6 | 105.520 | 2.92 | 1.72916 | 54.7 |
| 7 | −58.575 | 0.10 | — | — |
| 8 | 19.783 | 5.08 | 1.48749 | 70.2 |
| 9 | −128.547 | 1.30 | 1.81786 | 23.7 |
| 10 | 64.000 | 1.92 | — | — |
| Diaphragm | | variable | | |
| 11 | −263.618 | 1.58 | 1.80518 | 25.4 |
| 12 | −64.516 | 1.30 | 1.69680 | 55.5 |
| 13 | 52.387 | variable | — | — |
| 14 | −993.485 | 3.78 | 1.72916 | 54.7 |
| 15 | −25.674 | 1.43 | — | — |
| 16 | −16.202 | 1.30 | 1.80518 | 25.4 |
| 17 | −21.880 | — | — | — |

TABLE 5

| f | 29.00 | 52.80 | 68.00 |
|---|---|---|---|
| $F_{NO}$ | 1:4 | 1:4 | 1:4 |
| ω | 38.3° | 22.1° | 17.4° |
| fb | 36.69 | 36.69 | 36.69 |
| d5 | 32.70 | 8.10 | 2.00 |
| d10 | 1.13 | 9.32 | 14.19 |
| d13 | 15.39 | 7.19 | 2.32 |

TABLE 6

No. 3

K = −1.000000
A4 = 0.666032 × 10$^{-5}$
A6 = 0.280034 × 10$^{-8}$
A8 = 0.109723 × 10$^{-10}$
A10 = −0.243096 × 10$^{-13}$

Embodiment 3

Figure 11:
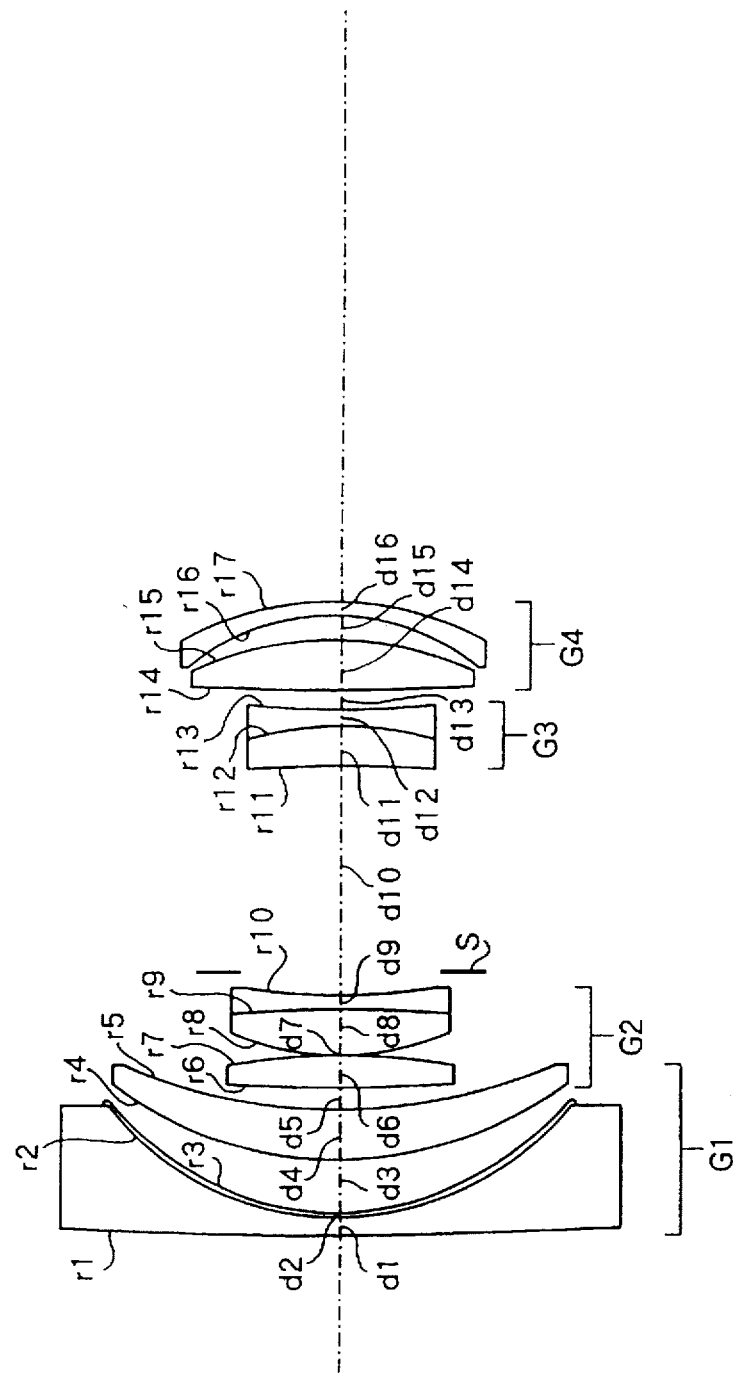
FIG. 11 is a schematic view of a lens arrangement of the zoom lens according to the third embodiment of the present invention, at a telephoto extremity.
Figure 12:
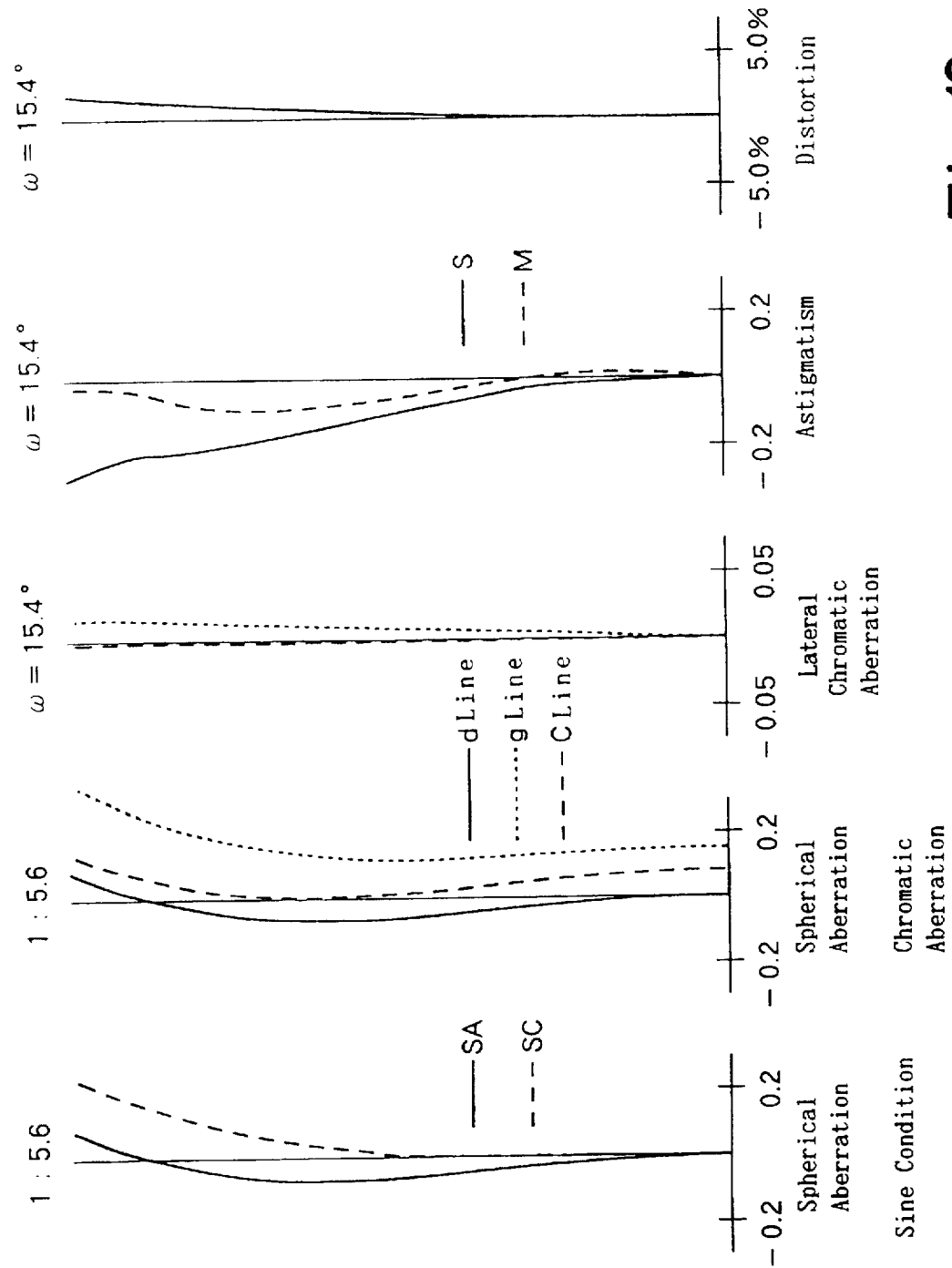
FIGS. 12A, 12B, 12C, 12D and 12E are aberration diagrams of the zoom lens shown in FIG. 11.

FIGS. 9 and 11 show a third embodiment of a lens arrangement of a zoom lens at a wide-angle extremity and a telephoto extremity, respectively. Data regarding the third embodiment is shown in Tables 7 and 8 below.

In the third embodiment, the resin film layer is formed on the second surface of the first lens element on the image side, as in the first embodiment. The constants of the surface (surface No. 3) of the resin film layer which represent the shape of the aspherical surface are shown in Table 9. In the third embodiment, the diaphragm S is moved together with the second lens group G2.

FIGS. 10A through 10E and FIGS. 12A through 12E show various aberrations in the third embodiment, at the wide-angle extremity and telephoto extremity, respectively.

TABLE 7

| Surface No. | r | d | n | ν |
|---|---|---|---|---|
| 1 | 429.731 | 1.50 | 1.69680 | 55.5 |
| 2 | 21.859 | 0.20 | 1.53256 | 45.9 |
| 3 | 19.077 | 4.00 | — | — |
| 4 | 27.825 | 3.76 | 1.84666 | 23.8 |
| 5 | 41.440 | variable | — | — |
| 6 | 83.234 | 2.44 | 1.77250 | 49.6 |
| 7 | −61.352 | 0.10 | — | — |
| 8 | 19.315 | 3.46 | 1.48749 | 70.2 |
| 9 | −107.906 | 1.10 | 1.80518 | 25.4 |
| 10 | 51.600 | 1.52 | — | — |
| Diaphragm | | variable | | |
| 11 | −61.697 | 3.00 | 1.84666 | 23.8 |
| 12 | −26.158 | 1.10 | 1.58144 | 40.7 |
| 13 | 49.258 | variable | — | — |
| 14 | 770.778 | 3.67 | 1.71299 | 53.9 |
| 15 | −26.066 | 1.76 | — | — |
| 16 | −16.923 | 1.10 | 1.80518 | 25.4 |
| 17 | −23.852 | — | — | — |

TABLE 8

| f | 29.00 | 55.00 | 77.00 |
|---|---|---|---|
| $F_{NO}$ | 1:3.5 | 1:4.5 | 1:5.6 |
| ω | 38.3° | 21.3° | 15.4° |
| fb | 36.92 | 36.92 | 36.92 |
| d5 | 38.13 | 9.79 | 1.53 |
| d10 | 2.52 | 9.71 | 15.36 |
| d13 | 14.35 | 7.16 | 1.51 |

TABLE 9

No. 3

K = −1.000000
A4 = 0.470896 × 10$^{-5}$
A6 = 0.154255 × 10$^{-7}$
A8 = −0.318991 × 10$^{-10}$
A10 = 0.289932 × 10$^{-13}$

Embodiment 4

Figure 13:
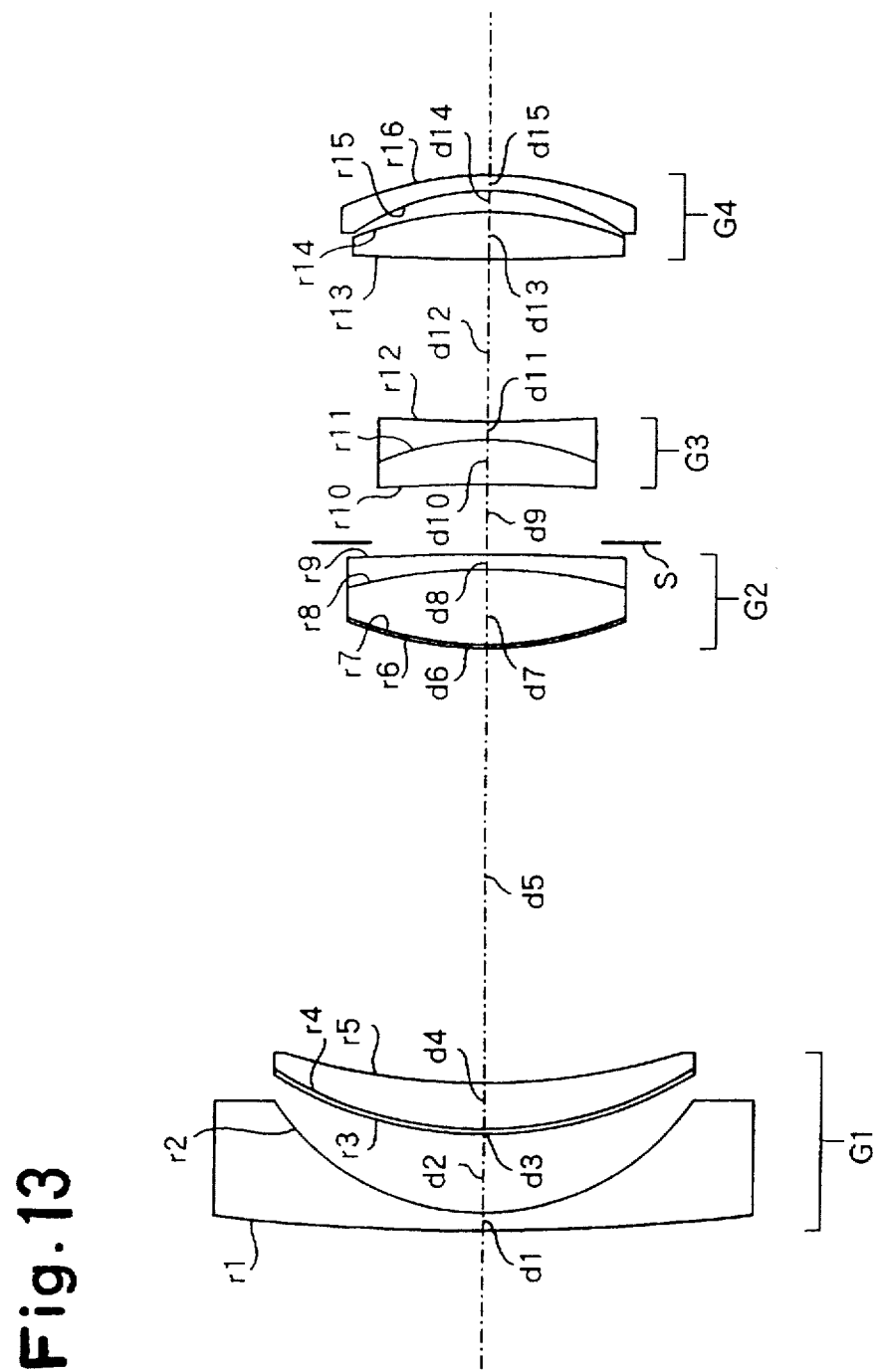
FIG. 13 is a schematic view of a lens arrangement of a zoom lens according to a fourth embodiment of the present invention, at a wide-angle extremity.
Figure 14:
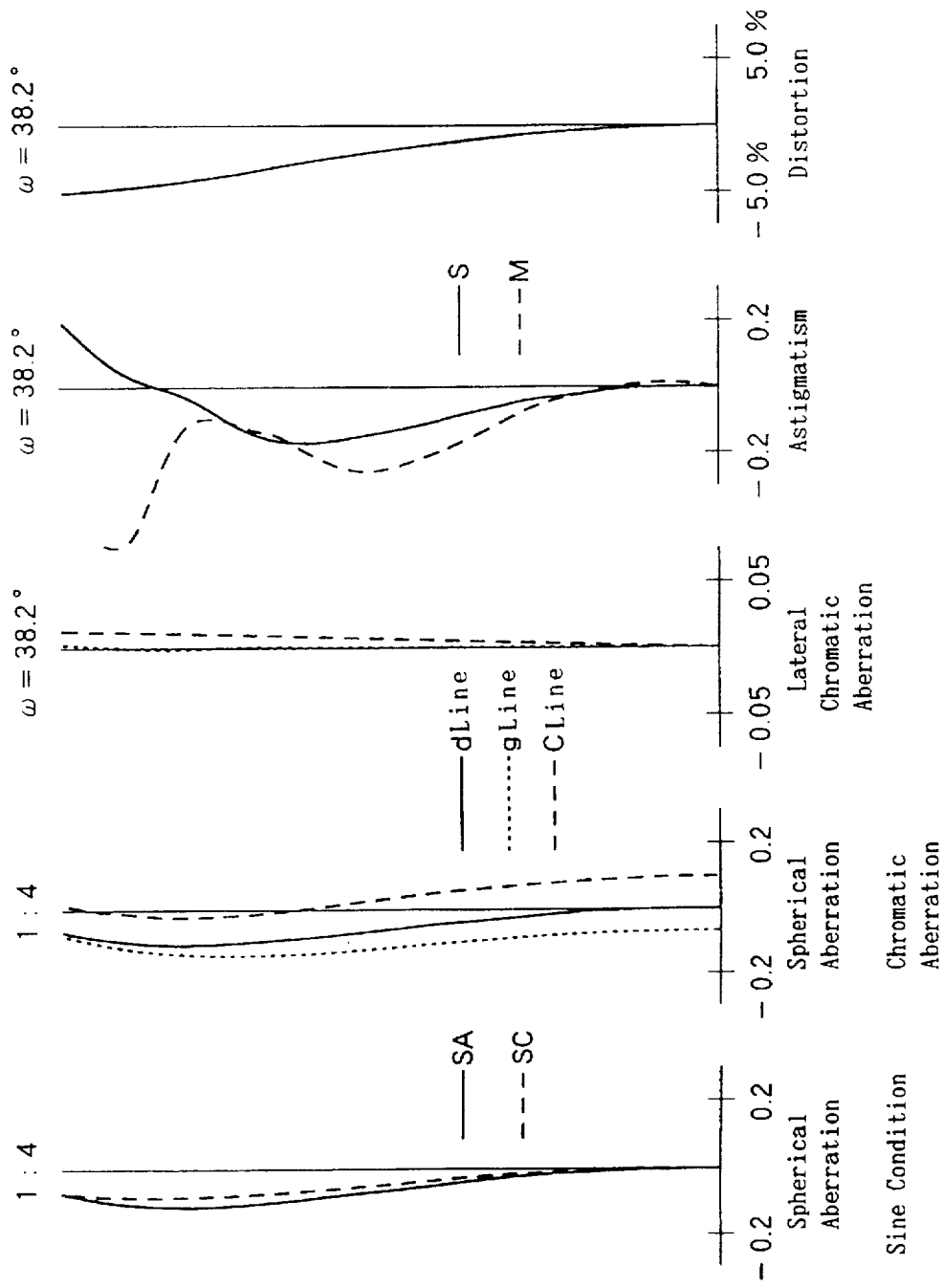
FIGS. 14A, 14B, 14C, 14D and 14E are aberration diagrams of the zoom lens shown in FIG. 13.
Figure 15:
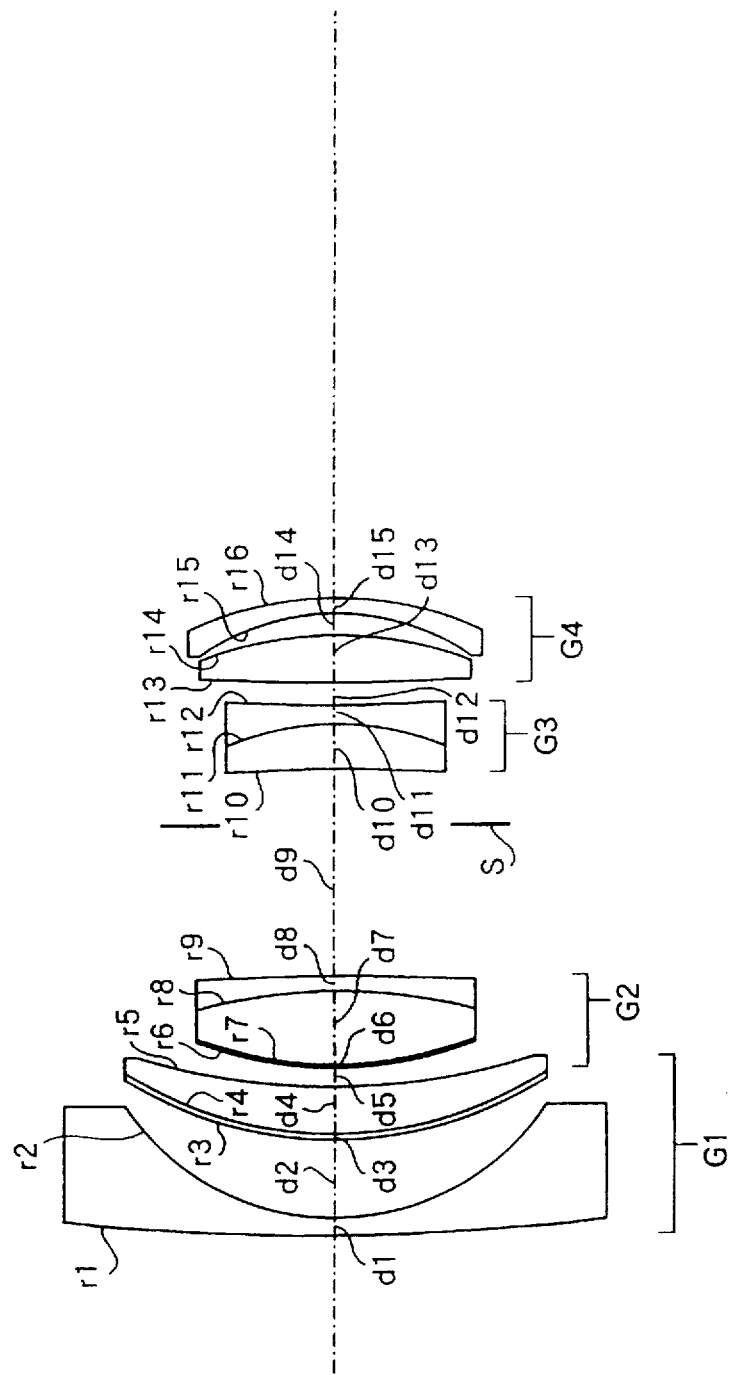
FIG. 15 is a schematic view of a lens arrangement of a zoom lens according to the fourth embodiment of the present invention, at a telephoto extremity.
Figure 16:
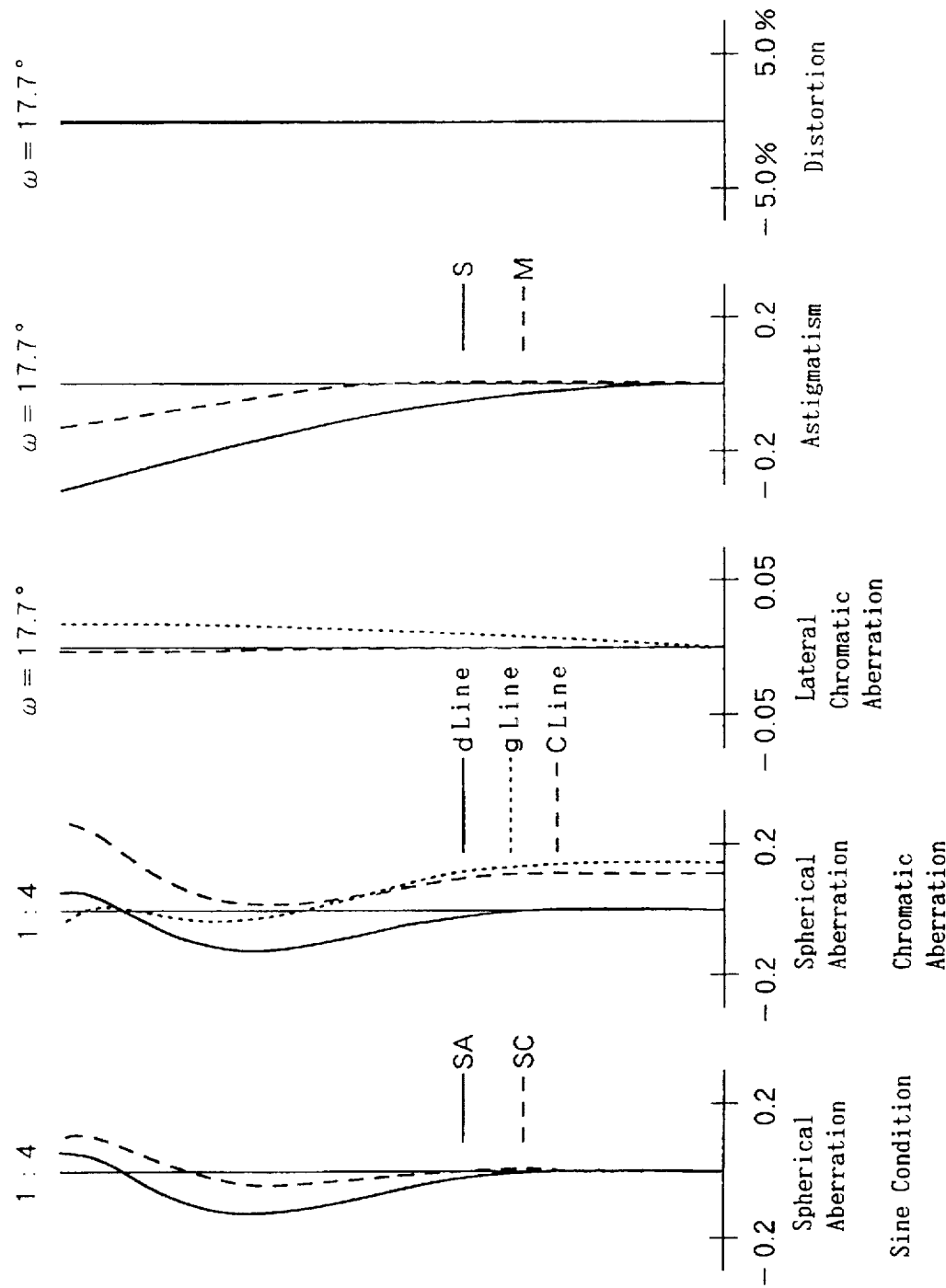
FIGS. 16A, 16B, 16C, 16D and 16E are aberration diagrams of the zoom lens shown in FIG. 15; and, FIG. 17 is a schematic view of loci of the movement of a zoom lens according to the present invention, by way of example.

FIGS. 13 and 15 show a fourth embodiment of a lens arrangement of a zoom lens at a wide-angle extremity and a telephoto extremity, respectively. Data regarding the third embodiment is shown in Tables 10 and 11 below.

In the fourth embodiment, resin film layers are formed on the surface of the positive second lens element of the first lens group G1 on the image side and on the object side surface of the lens element of the second lens group G2 that is located on the object side. The constants of the surfaces (surface Nos. 3 and 6) of the resin film layers which represent the shape of the aspherical surfaces are shown in Table 12. In the fourth embodiment, the diaphragm S is moved together with the third lens group G3.

FIGS. 14A through 14E and FIGS. 16A through 16E show various aberrations in the fourth embodiment, at the wide-angle extremity and telephoto extremity, respectively.

TABLE 10

| Surface No. | r | d | n | ν |
|---|---|---|---|---|
| 1 | 159.017 | 1.30 | 1.62041 | 60.7 |
| 2 | 18.276 | 6.05 | — | — |
| 3 | 40.354 | 0.20 | 1.52249 | 59.8 |
| 4 | 29.250 | 3.59 | 1.75520 | 27.5 |
| 5 | 50.730 | variable | — | — |

TABLE 10-continued

| Surface No. | r | d | n | v |
|---|---|---|---|---|
| 6 | 25.326 | 0.10 | 1.52249 | 59.8 |
| 7 | 25.326 | 5.58 | 1.72916 | 54.7 |
| 8 | −37.891 | 1.10 | 1.84666 | 23.8 |
| 9 | −258.549 | variable | — | — |
| Diaphragm |  | 4.24 | — | — |
| 10 | −148.524 | 3.50 | 1.76182 | 26.5 |
| 11 | −20.119 | 1.10 | 1.66446 | 35.8 |
| 12 | 56.878 | variable | — | — |
| 13 | 137.802 | 3.59 | 1.69680 | 55.5 |
| 14 | −29.004 | 1.73 | — | — |
| 15 | −17.464 | 1.10 | 1.84666 | 23.8 |
| 16 | −25.628 | — | — | — |

TABLE 11

| f | 29.00 | 48.37 | 68.00 |
|---|---|---|---|
| $F_{NO}$ | 1:4 | 1:4 | 1:4 |
| ω | 38.2° | 24.5° | 17.7° |
| fb | 36.94 | 49.56 | 61.72 |
| d5 | 32.72 | 10.31 | 1.20 |
| d9 | 0.99 | 6.32 | 11.44 |
| d12 | 11.97 | 6.65 | 1.52 |

TABLE 12

| No. 3 | No. 6 |
|---|---|
| K = 0.000000 | K = 0.000000 |
| A4 = 0.120532 × 10$^{-4}$ | A4 = −0.776686 × 10$^{-5}$ |
| A6 = 0.371259 × 10$^{-7}$ | A6 = −0.761442 × 10$^{-8}$ |
| A8 = −0.113988 × 10$^{-9}$ | A8 = −0.603861 × 10$^{-10}$ |
| A10 = 0.560410 × 10$^{-12}$ | A10 = 0.117792 × 10$^{-12}$ |

Table 13 shows numerical values for the above-mentioned requirements of the zoom lens in the embodiments 1 through 4 and the prior art disclosed in U.S. Pat. No. '839 mentioned above. In Table 13, the symbol ○ represents that the values satisfy the requirements are x represents that the values do not satisfy the requirements.

TABLE 13

|  | Embodiment 1 |  | Embodiment 2 |  | Embodiment 3 |  |
|---|---|---|---|---|---|---|
| (1)z2/z234 | 1.14 | ○ | 1.14 | ○ | 1.11 | ○ |
| (2)Fw | 4.0 | ○ | 4.0 | ○ | 3.5 | ○ |
| (3)ft/f3 | −1.00 | ○ | −1.00 | ○ | −1.19 | ○ |
| (4)m34w | 1.07 | ○ | 1.07 | ○ | 1.11 | ○ |
| (5)dG1/fw | 0.38 | ○ | 0.39 | ○ | 0.33 | ○ |
| (6)n1 | 1.60 | ○ | 1.60 | ○ | 1.70 | X |

|  | Embodiment 4 |  | Prior Art |  |
|---|---|---|---|---|
| (1)z2/z234 | 1.16 | ○ | 0.88 | X |
| (2)Fw | 4.0 | ○ | 4.0 | ○ |
| (3)ft/f3 | −0.82 | ○ | −2.11 | X |
| (4)m34w | 0.96 | ○ | 2.09 | X |
| (5)dG1/fw | 0.38 | ○ | 0.85 | X |
| (6)n1 | — |  | — |  |

As can be understood from the foregoing, according to the present invention, since the zooming function is mainly achieved by the second lens group, so that the third and fourth lens groups are adapted essentially to correct aberrations caused during the zooming operation, little or no variation of the aberration takes place during the zooming operation.

What is claimed is:

1. A zoom lens comprising a negative first lens group, a positive second lens group, a negative third lens group and a positive fourth lens group, arranged in this order from an object side, whereupon when zooming from a wide-angle extremity towards a telephoto extremity, all of said lens groups are moved so that a distance between said first and said second lens groups is reduced, a distance between said second and said third lens groups is increased, and a distance between said third and said fourth lens groups is reduced, and said zoom lens satisfying the following relationships:

$$1.0<z2/z234<1.5$$

$$Fw>3.4$$

where z2 represents a ratio obtained by dividing a lateral magnification of said second lens group at said telephoto extremity by a lateral magnification of said second lens group at said wide-angle extremity, z234 represents a ratio obtained by dividing a resultant lateral magnification of said second through fourth lens groups at said telephoto extremity by a lateral magnification of said second through fourth lens groups at said wide-angle extremity, and Fw represents an F-number of said zoom lens at said wide-angle extremity.

2. The zoom lens according to claim 1, wherein said zoom lens satisfies the following relationships:

$$-1.9<ft/f3<-0.6$$

$$m34w<1.4$$

wherein, ft represents a focal length of said zoom lens at said telephoto extremity, f3 represents a focal length of said third lens group, and m34w represents a resultant lateral magnification of said third and said fourth lens groups at said wide-angle extremity.

3. The zoom lens according to claim 1, wherein said first lens group consists of a negative first lens element and a positive second lens element arranged in this order from said object side, at least one surface of said first and second lens elements of said first lens group being an aspherical surface, and further satisfying the following relationship:

$$0.30<dG1/fw<0.55$$

wherein, dG1 represents a thickness of said first lens group on an optical axis of said zoom lens, and fw represents a focal length of said zoom lens at said wide-angle extremity.

4. The zoom lens according to claim 3, wherein said aspherical surface of said first lens group is formed by a resin film layer formed on one surface of said first lens element and satisfies the following relationship:

$$1.50<n1<1.65$$

wherein, n1 represents a refractive index of said first lens element.

5. The zoom lens according to claim 1, wherein said zoom lens satisfies the following relationship:

$$Fw<5.6$$

* * * * *